(12) United States Patent
Parisis et al.

(10) Patent No.: US 7,555,137 B2
(45) Date of Patent: Jun. 30, 2009

(54) METHOD OF WATERMARKING A COLOR IMAGE BY VECTORIAL APPROACH, METHOD OF DETECTING A MARK OF WATERMARKING, CORRESPONDING DEVICES, IMAGE AND COMPUTER PROGRAMS

(75) Inventors: Alice Parisis, Chasseneuil-du-Poitou (FR); Philippe Carre, Poitiers (FR); Nathalie Laurent, Vignoc (FR)

(73) Assignees: France Telecom, Paris (FR); Universite de Poitiers, Futuroscope Chasseneuil Cedex (FR)

( * ) Notice: Subject to any disclaimer, the term of this patent is extended or adjusted under 35 U.S.C. 154(b) by 995 days.

(21) Appl. No.: 10/821,792

(22) Filed: Apr. 9, 2004

(65) Prior Publication Data

US 2004/0264736 A1 Dec. 30, 2004

(30) Foreign Application Priority Data

Apr. 11, 2003 (FR) .................. 03 04592

(51) Int. Cl.
*G06K 9/00* (2006.01)
(52) U.S. Cl. ....................... 382/100; 382/162
(58) Field of Classification Search ........ 382/100
See application file for complete search history.

(56) References Cited

U.S. PATENT DOCUMENTS

| | | | | |
|---|---|---|---|---|
| 5,889,868 A | * | 3/1999 | Moskowitz et al. | 713/176 |
| 6,167,156 A | * | 12/2000 | Antoniades et al. | 382/232 |
| 6,535,616 B1 | * | 3/2003 | Hayashi et al. | 382/100 |
| 6,577,747 B1 | * | 6/2003 | Kalker et al. | 382/100 |
| 2002/0067844 A1 | * | 6/2002 | Reed et al. | 382/100 |
| 2003/0012402 A1 | | 1/2003 | Ono | 382/100 |
| 2003/0174862 A1 | * | 9/2003 | Rhoads et al. | 382/100 |
| 2004/0264736 A1 | * | 12/2004 | Parisis et al. | 382/100 |
| 2007/0140523 A1 | * | 6/2007 | Parisis et al. | 382/100 |

OTHER PUBLICATIONS

Adnan M. Alattar, "Smart Images" Using Digimarc's Watermarking Technology, 2000, SPIE, Security and Watermarking of Multimedia Contents II, Proceedings of SPIE, vol. 3971 (2000), pp. 264-273.*

Caramma M. et al., "A Blind and Readable Watermarking Technique for Color Images", Proceedings 2000 International Conference on Image Processing, ICIP 2000, vol. 1, Sep. 10, 1999, pp. 442-445, Vancouver, XP010530646.

Piva A. et al., "Exploiting the Cross-Correlation of RGB-Channels for Robust Watermarking of Color Images", Image Processing, 1999. ICIP 99. Proceedings, 1999 International Conference on Kobe, Japan, Oct. 24-28, 1999, Piscataway NJ, USA, IEEE, US, Oct. 24, 1999, pp. 306-310, X[010369136.

(Continued)

*Primary Examiner*—Matthew C. Bella
*Assistant Examiner*—Sath V. Perungavoor
(74) *Attorney, Agent, or Firm*—Westman, Champlin & Kelly, P.A.

(57) ABSTRACT

A method of watermarking a color image that has at least three components is provided. Such a method of watermarking includes an insertion step of a mark of watermarking, on at least one point of the image, according to an insertion rule taking into account the relative position of at least three component vectors, associated to said at least one point.

23 Claims, 6 Drawing Sheets

OTHER PUBLICATIONS

Coltuc D. et al., "Image Authentication by Exact Histogram Specification", Workshop on Multimedia Signal Processing, Cannes, France, Oct. 2001.

D. Gruhl, W. Bender & Moritomo, "Techniques for Data Hiding" in Processing SPIE, vol. 2420, pp. 40, Feb. 1995.

V. Solachidis et I. Pitas, "Self-Similar Ring Shaped Watermark Embedding in 2-D DFT Domain", 10$^{th}$ European Signal Processing Conference EUSIPCO '2000, Tampere, Finland, pp. 1977-1980, Sep. 2000.

F. Alurki and R. Mersereau, "A Robust Digital Watermark Procedure for Still Images Using DCT Phase Modulation", 10$^{th}$ European Signal Processing Conference EUSIPCO '2000, Tampere, Finland, pp. 1961-1964, Sep. 2000.

D. Kundur & D. Hatzinakos, "Digital Watermarking Using Multi-Resolution Wavelet Decomposition", Proceedings of IEEE ICASSP '98, vol. 5, pp. 2969-2972, Seattle, WA, USA, May 1998.

L. Akarun, N. Ozdilek, B.U. Oztekin, "A Novel Technique for Data Hiding in Color Paletted Images", Proceedings of the 10$^{th}$ European Signal Processing Conference, EUSIPCO'00, Tampere, Finland, pp. 123-126, Sep. 2000.

S. Battiato, D. Catalano, G. Gallo & R. Gennaro, "Robust Watermarking for Images Based on Color Manipulation", Proceedings of the 3$^{rd}$ Workshop on Information Hiding, LNCS 1768, pp. 302-317, Dresden, 1999.

Kutter M., Jordan F. & Bossen F., "Digital Signature of Color Images Using Amplitude Modulation", Processing of SPIE Storage and retrieval for Image and Video Databases, San Jose, USA, vol. 3022, No. 5, pp. 518-526, Feb. 1997.

A. Reed and B. Hannigan, "Adaptive Color Watermarking", Proceedings of SPIE, Electronic Imaging, vol. 4675, Jan. 2002.

J.J. Chae, D. Mukherjee and B.S. Manjunath, "Color Image Embedding Using Multidimensional Lattice Structures", Proceeding of IEEE International Conference on Image Processing, Chicago, IL., vol. 1, pp. 460-464, Oct. 1998.

* cited by examiner

METHOD OF WATERMARKING A COLOR IMAGE BY VECTORIAL APPROACH, METHOD OF DETECTING A MARK OF WATERMARKING, CORRESPONDING DEVICES, IMAGE AND COMPUTER PROGRAMS

FIELD OF THE INVENTION

The field of the invention is that of the watermarking of still color images. More precisely, the invention concerns a watermarking technique which allows signatures to be incorporated into an image, taking into account the color dimension of the latter.

BACKGROUND OF THE INVENTION

The field of image tattooing, which is still called watermarking, is currently booming, and is the subject of much research, both in the fields of video sequences and still images.

We can currently distinguish two main families of image watermarking, respectively corresponding to the watermarking of gray levels images and of color images.

Indeed, the first years of research in the field of watermarking were mainly based on techniques for protecting gray levels images, and led to the use of three distinct fields of marking: the fields of space, frequency and multi-resolution.

The watermarking models in the space field (where the mark is applied directly to the pixel values) have the advantage of only requiring a short calculation time. They are generally resistant to geometrical attacks (for example rotation and changing of scale). The methods proposed are histogram modification (Coltuc D. et al., *"Image authentication by exact histogram specification"*, workshop on multimedia signal processing, Cannes, France, October 2001) or again patchwork techniques (D. Gruhl, W. Bender, Moritomo, *"Techniques for data hiding"* in processing SPIE, volume 2420, page 40, February 1995).

As concerns the watermarking models in the frequency field, they have the advantage of being resistant to compression (such as JPEG for example). The mark is applied to the coefficients resulting from a Fourier type transformation (as presented for example by V. Solachidis et I. Pitas, *"Self-similar ring shaped watermark embedding in 2-D DFT domain"*, $10^{th}$ European Signal Processing Conference EUSIPCO'2000, Tampere, Finland, pages 1977-1980, September 2000) or Discret Cosinus (as presented for example by F. Alurki and R. Mersereau, *"A robust digital watermark procedure for still images using DCT phase modulation"*, $10^{th}$ European Signal Processing Conference EUSIPCO'2000, Tampere, Finland, pages 1961-1964, September 2000).

Marking in the multi-resolution field offers several advantages. It is above all the field used in the most recent compression standards. It also allows the frequency band which will bear the mark to be chosen, thus permitting the risks of the image being damaged by the application of the mark to be reduced (as illustrated by D. Kundur and D. Hatzinakos, *"Digital watermarking using multi-resolution wavelet decomposition"*, Proceedings of IEEE ICASSP '98, vol. 5, pages 2969-2972, Seattle, Wash., USA, May 1998).

Apart from these watermarking techniques for gray levels images, a second main family of watermarking techniques for still images proposes taking into account the color dimension of the images.

In this family, we can first of all distinguish a first sub-family of techniques consisting of adapting the gray levels methods to the three color components. Parameters are then used to control the force of the marking on each component in order to take into account the characteristics of the human viewing system.

A second sub-family groups methods which are specific to the color images. It takes into account the human viewing system and uses the characteristics of the color representations.

For example, one particular method, specific to color images, is that proposed by L. Akarun, N. Özdilek, B. U. Öztekin, *"A Novel Technique for Data Hiding in Color Palletted Images"*, Proceedings of the $10^{th}$ European Signal Processing Conference, EUSIPCO'00, Tampere, Finland, pages 123-126, September 2000.

The first step of this method consists of quantifying the color space using the 'median-cut' algorithm. This consists of iteratively partitioning the color space with planes that are perpendicular to the color axes and passing through the median values of the data.

There are two possible cases:
all of the palette is used in the representation of the image, or
certain values of the palette are not used by the image.

The first case is then no longer adapted to the marking algorithm. However the palette obtained includes colors that the human eye cannot distinguish. By using this property, certain colors of the palette can be liberated, so that they are not used in the image to be marked.

The author proposes that two colors are indiscernible if $\Delta E<3$ where $\Delta E=\sqrt{(L_1-L_2)^2+(a_1-a_2)^2+(b_1-b_2)^2}$ in the Lab space. A reminder is made that the Lab representation space is a perceptually uniform space. L represents the luminance and the a and b components are chromatic.

Let M(i) be the mark, composed of colors that are not part of the palette. The author points out that a binary mark (made up of two colors) is more robust (the risk of detection error is thus reduced).

Let C be the most frequently used color of color histogram, each absciss corresponding to a color of the palette.)

The mark contains a lower number of elements than the number of color pixels C, i<h(C). Each of these elements is indiscernible from the color C.

The marking consists of replacing the $i^{th}$ pixel of color C by M(i).

Another original method is that proposed by S. Battiato, D. Catalano, G. Gallo, R. Gennaro, in *"Robust Watermarking for Images based on Color Manipulation"*, Proceedings of the 3rd Workshop on Information hiding, LNCS 1768, pages 302-317, Dresden, 1999. According to this method, the mark is not created for the image beforehand, but it is the colorimetric content of the image which represents the mark. One disadvantage of this technique is that it requires a lot of data to be stored.

The color space proposed by the author respects two properties:
the space must be perceptually uniform (as are the Lab and Luv spaces) so that a Euclidian distance measurement can be assimilated to a difference in color for the human viewing system;
the switch to this space, noted $LC_1C_2$, must be rapid, simple and have no loss of information.

The field of opposed colors is defined here from RGB, as follows:

$RGB \to LC_1C_2$:

$$\begin{cases} L = R + G + B; \\ C_1 = 2B - R - G; \text{ and} \\ C_2 = R - 2G + b. \end{cases}$$

$LC_1C_2 \to RGB$:

$$\begin{cases} R = (L + C_2 - C_1)/3; \\ G = (L - C_2)/3 \\ B = (C_1 + L)/3. \end{cases}$$

According to the authors, this space is the closest to the representation of the chromatic channels of the human viewing system.

The marking is carried out as follows. The mark is a vector M(n), n=1, . . . , k, . . . , N where N is the number of colors of the image and k is a color of the image. Let $(LC_1C_2)_k$ be the color associated to the index k, represented by a vector in the $LC_1C_2$ space. A radius is selected in a sphere defined around the coordinate point $(LC_1C_2)_k$ randomly. For each pixel (x,y) corresponding to the color k, the vector corresponding to the (previously determined) radius is added to the initial color vector to obtain the marked vector $(LC_1C_2)_k'$.

Each color is thus marked by adding a same vector. The marked image is reconstructed by replacing the original colors with the marked colors, by respecting the coordinates of the image pixels.

The mark is then formed by all of the colors of the original image.

Detection is made by comparing the marked image with the marks generated on all of the images processed. This is carried out as follows. Firstly, it must be considered that the image on which the detection is to be made has the same number of colors as the original image. The detection algorithm compares the image to each of the recorded marks. Color by color, a search is made for the closest mark (where the difference vectors between the two pixels of the same coordinate are the most similar). The mark corresponding to the marked image is that with the highest number of difference vectors between the colors of the marked image and the original image in common.

It can be noted that the various publications concerning color watermarking techniques are generally consecrated to the integrity of the visual appearance and the robustness of these techniques against classic attacks is hardly developed.

Generally, for methods whose basic algorithm can be applied to gray levels images, the marking uses the following technique:
  switch in the transformed space (wavelet coefficients, discrete cosine coefficients, etc.)
  application of the following formula:

$$I'_W(i,j) = I'(i,j) + \alpha(i,j)M(i,j)$$

where $I'_W$ represents the transform of the marked image (or component), I' the transform of the original image (or component), M the mark, $\alpha$ the marking intensity control factor, and where i and j represent the coordinates of the processed pixel.

The algorithms based on the characteristics of the color components are more adapted to the characteristics of the human viewing system. The first article of Kutter M., Jordan F. and Bossen F, (*"Digital Signature of Color Images using Amplitude Modulation"*, Processing of SPIE storage and retrieval for image and video databases, San Jose, USA, volume 3022, number 5, pages 518-526, February 1997) on color watermarking proposed working on the blue component of the RGB system, for which the human eye is the least sensitive.

This idea was also taken up by A. Reed and B. Hannigan, in *"Adaptive Color Watermarking"*, Proceedings of SPIE, Electronic Imaging, volume 4675, January 2002. These authors propose working on the yellow component of the system CMY (Cyan Magenta Yellow, which is a colorimetric space), as they considered that the human eye is less sensitive to color variations on the yellow-blue axis.

Generally speaking, the blue component allows the mark to be hidden more effectively (but it is not as strong) and the green component allows the mark to be protected more effectively against attacks (but with greater visual damage to the image). This is explained by the fact that the human viewing system is more sensitive to variations in green than in blue. The compromise between invisibility and strength of the mark therefore depends on the colorimetric nature of the component.

Finally, a last technique, proposed by J. J. Chae, D. Mukherjee, and B. S. Manjunath, in *"Color Image Embedding using Multidimensional Lattice Structures"*, Proceeding of IEEE International Conference on Image Processing, Chicago, Ill., volume 1, pages 460-464, October 1998, is based on a vectorial type approach.

According to this technique, the first step of the marking consists of breaking down into wavelets the initial image and the signature (which may also be an image). A single breakdown level is used. In this way, the wavelet coefficients of the original image are obtained, noted $(C_Y, C_U, C_V)(x,y)$, for which each component corresponds to the color component of the YUV space, and the wavelet coefficients of the mark. The use of the YUV space (space used for video: Y is the luminance component, U and V are chromatic components) thus allows a direct adaptation of this technique to video documents.

The wavelet coefficients resulting from this breakdown of the mark are quantified in $\beta$ levels. We thus obtain a vector $\vec{M}$, $(M_Y, M_U, M_V)(x,y)$ for a color mark and M(x,y) for a gray levels, containing $(s_i)$ elements where $1 < i < \beta$.

The integration of the mark can be written as follows:

$$(C_Y, C_U, C_V)_i'(x,y) = (C_Y, C_U, C_V)_i(x,y) + \alpha \vec{M}(s_i)$$

where $\alpha$ is the control factor for the marking force.

The detection of the mark is then carried out as follows. After application of the transform in wavelets onto the marked image, the resulting coefficients are quantified in $\beta$ levels.

To estimate the closest vector to that used for the mark, a search is carried out for the quantification value of the closest coefficient to those of the initial image (the mark is then detected, element by element).

The image corresponding to the mark detected can thus be reconstructed by transformation of the inverse wavelets.

All of the gray levels or color watermarking techniques described above have a number of disadvantages.

Therefore, the watermarking techniques for color images based on gray levels algorithms do not permit the color dimension of the images to be taken into account. Consequently, they do not permit the compromise between the invisibility and the strength of the mark to be optimized.

The color image watermarking techniques are very complex and all attempt to satisfy an invisibility objective for the mark. In other words, they are not strong enough to resist classic attacks such as compression or filtering.

The technique proposed by Chae et al. described above, even though it uses a vectorial approach, has the disadvantage of not being resistant to compression. Among others, this marking method does not allow making documents secure to be envisaged. Finally, this technique does not take into account the color dimension of the image, as it attributes the same marking force to the three color components of the image.

Finally, none of the techniques of the prior art using a wavelet breakdown offers blind marking, permitting detection of the mark without the original image being required. Furthermore, none of these techniques offers resistance to JPEG compression, median filtering and the addition of noise.

The particular aim of the invention is to overcome these disadvantages of the prior art.

More precisely, one aim of the invention is to provide a color watermarking technique permitting one or more signatures to be incorporated to a color image.

In other terms, one aim of the invention is to provide a technique for making documents secure by the invisible insertion of a mark.

Another aim of the invention is to implement such a technique that is resistant to most attacks. In particular, one aim of the invention is to provide such a technique which is resistant to compression (especially JPEG type), to filtering (especially by a median filter) and the addition of noise.

The invention has another aim of implementing such a technique which permits blind detection, which is to say that does not require the original image, of the mark in an image.

Another aim of the invention is to provide such a technique permitting the visibility of the mark to be reduced in comparison to the techniques of the prior art.

These aims, as well as others which will become clearer further on, are achieved by a color watermarking process with at least three components.

SUMMARY OF THE INVENTION

According to the invention, such a process comprises a step where the watermark is inserted, on at least one point of the image, according to an insertion rule taking into account the relative position of at least three component vectors, for each of said components respectively, associated to said at least one point.

In this way, the invention is based on a completely new and inventive approach of color images watermarking. In fact, the invention is based on a vectorial approach, permitting, in comparison with the techniques of the prior art, to take into account the color dimension of the image.

The watermark is therefore no longer, contrary to the techniques of the prior art, applied identically to the three color components of the image; in other terms, whereas, according to the prior art, independent marking of the three component vectors of the image was carried out, according to the invention, these three vectors are now taken into account in synergy for the insertion of the mark.

The implementation of a vectorial approach permits, in terms of resistance, to obtain more stable responses than with the techniques of the prior art in the field of wavelets, such as that of Kundur et al. mentioned previously, as the watermarking technique in the wavelet field. Such a vectorial approach also permits the variations induced by the mark in the color field to be minimized, and therefore slightly improve the invisibility of the mark with respect to the techniques of the prior art.

Advantageously, for each of the said points concerned, two vectors are selected as reference and one vector to be marked in order to bear the said watermark.

It can be noted that the invention consists therefore, contrary to the prior art, of marking the component vectors (i.e. color vectors for example), and not just coefficients of the image.

Preferably, the said vector to be marked is the central vector, situated between the said reference vectors.

Advantageously, the distances are calculated two by two between said three vectors, said reference vectors being the furthest apart from one another.

Preferably, a frontier is determined between the said reference vectors, defining two zones respectively associated to the binary values "0" and "1".

Two half spaces are thus created, respectively associated to each of said reference vectors, and corresponding to a value "0" or "1" of the mark that is to be inserted.

Advantageously, said frontier is defined by the bisector between said reference vectors.

According to one advantageous characteristic of the invention, the marking of the said vector to be marked comprises a possible shift of the said vector to be marked to one of the said zones, according to the binary value of the marking to be applied.

Therefore, if a value "0" mark is to be inserted on the vector to be marked and the vector to be marked is in the zone or the half space associated to the binary value "1", its end is moved so that it is positioned in the other half space, or zone, associated to the value "0".

If a value "0" mark is to be inserted on the vector to be marked and the vector to be marked is already in the zone associated to the binary value "0", its end may also be moved so that it is moved closer to the reference vector located in this half space, in order to increase the resistance of the mark (while remaining of course in the half space associated to the binary value "0").

According to another advantageous characteristic of the invention, the said movement has a variable amplitude, according to a marking force selected to suit at least one local characteristic of the said image.

In this way, according to the colorimetric characteristics or local texture characteristics of the image, a mark that is more or less visible and more or less resistant can be chosen, according to the marking force selected. Such a marking force may adopt for example a value included between 0 and 1, a nil force corresponding to a mark with low resistance and invisible, and a force equal to 1 corresponding to a strong but visible mark.

According to one advantageous variant of the invention, such a watermarking process also comprises a wavelet transformation step for each of the said components of the image, and the said three component vectors are determined, for each point of at least one level of breakdown of the said wavelet transformation, for each of the said components respectively.

The invention therefore combines with the vectorial approach a breakdown into wavelets of the image. The use of such a wavelet transformation advantageously permits the technique of the invention to be more resistant to JPEG type compression attacks, or median filtering or the addition of noise.

It can be noted that by "point", it is meant here a pixel position in a level of breakdown of the image, as illustrated by FIG. 10, which represents an image scale E 101, and the three detailed images $D_N^{1,R}$ 102, $D_N^{2,R}$ 103, $D_N^{3,R}$ 104 for the red component of a wavelet breakdown in an RGB system. The 105 "point" is defined by a same pixel position in each of the three detailed images referenced 102 to 104.

Preferably, at least two vector marking conventions are provided.

According to an advantageous characteristic of the invention, the marking convention selected for a given image is that limiting the risks of conflicts when detecting the said mark.

Preferably, one of the said conventions is selected according to the number of reference vectors present in the said image for each of the said components.

Thus, in an RGB type system for example, the number of times that the red, green and blue vectors are chosen as reference or marker vectors is determined, and the marking convention permitting the risks of conflict during detection of the mark to be minimized is deduced. For example, a marking convention is selected so that the vector the least often marked is situated in the conflict zone.

Preferably, the said marking is, at least in normal situations, calculated using the following equation:

$$\vec{V}_{M,W}(x,y) = \vec{V}_R(x,y) - (1-F_M)(\vec{V}_R(x,y) - \vec{V}_M(x,y))$$

where $\vec{V}_M(x,y)$ is the said vector to be marked, $\vec{V}_R(x,y)$ is one of the said reference vectors, $F_M$ is the said marking force and $\vec{V}_{M,W}(x,y)$ is the said marked vector.

Preferably, in the event of a conflict, the said marking is calculated using the following equation:

$$\vec{V}_{M,W}(x,y) = \vec{V}_R(x,y) - \text{beta}.(1-F_M)(\vec{V}_R(x,y) - \vec{V}_M(x,y)),$$

where beta<1.

Advantageously, such a watermarking process comprises, after the said step of associating a watermark, and an inverted wavelet transformation step, providing a marked image.

In this way, after carrying out a wavelet transformation of the various color components of the image, and after having inserted the watermark on the color vectors, a marked image is reconstructed by inverted wavelet transformation.

Advantageously, the said mark is a pseudo-random binary signature written redundantly.

The redundancy of the insertion of the mark permits better protection of the image and a higher probability that the watermark will be detected.

Preferably, the said components belong to the group comprising:
the RGB components;
the YUV components;
the CMY components.

More generally, all of the spaces where the color is represented can be used, whether it be the spaces defined by the CIE (International Lighting Commission) or original spaces.

The invention also concerns a device for watermarking a color image, with three components, and comprising means for inserting a watermark, on at least one point of the image, according to an insertion rule taking into account the relative position of three component vectors, for each of the said components respectively, associated to the at least said one point.

The invention also concerns a computer programme comprising programme code instructions recorded on a support that may be used in a computer for watermarking a color image, with three components. According to the invention, the said programme comprises programming means that may be read by the computer to carry out an insertion step for a watermark, on at least one point of the image, according to an insertion rule taking into account the relative position of three component vectors, for each of the said components respectively, associated to the said at least one point.

The invention also concerns a color image with three components and comprising a watermark obtained by insertion of a watermark, on at least one point of the image, according to an insertion rule taking into account the relative position of three component vectors, for each of the said components respectively, associated to the said at least one point.

The invention also concerns a watermark detection process for a watermarked image, made according to the previously described watermarking process. According to the invention, such a detection process comprises a step for recovering a watermark, on at least one point of the image, according to a recovery rule taking into account the relative position of three component vectors, for each of the said components respectively, associated to the said at least one point.

Preferably, the said recovery step comprises a sub-step for calculating the distances two by two between the said three vectors, and the said two vectors the furthest away from one another are the reference vectors, the third vector is the marked vector bearing the said watermark.

Advantageously, a frontier between the said reference vectors defining two zones respectively associated to the binary values "0" and "1", the said recovery step also comprises an identification sub-step for the zone in which the said marked vector is situated, and a step for associating a corresponding binary value.

Advantageously, the said mark is recovered at least twice, and a correlation calculation is used with respect to a reference signature, in order to decide if the watermark has been detected correctly or not.

The invention also concerns a device for detecting a watermark in a watermarked image, made according to the watermarking process previously described. According to the invention, such a device comprises means for recovering a watermark, on at least one point of the image, according to a recovery rule taking into account the relative position of three component vectors, for each of the said components respectively, associated to the said at least one point.

The invention also concerns a computer programme comprising programme code instructions stored on a support that may be used on a computer to detect a watermark in a watermarked image, made according to the process previously described. Such a programme comprises programming means that may be read by a computer to carry out a recovery step for a watermark, on at least one point of the image, according to a recovery rule taking into account the relative position of three component vectors, for each of the said components respectively, associated to the said at least one point.

BRIEF DESCRIPTION OF THE DRAWINGS

Other characteristics and advantages of the invention will become clearer upon reading the following description of a preferred embodiment, provided simply as a non-restrictive illustration, and the appended diagrams among which.

DETAILED DESCRIPTION OF THE PREFERRED EMBODIMENTS

The general principle of the invention is based on taking into account the color dimension of the images, and proposes a vectorial approach of watermarking. The invention thus permits vectorial marking taking into account, in synergy, the three color vectors of the image.

In one specific embodiment of the invention, which will be described in all of the rest of the document, this vectorial approach is combined with a wavelet breakdown of the color components of the image.

In this specific embodiment, the invention therefore consists of inserting a watermark into a color image by carrying out the following steps:

Transformation of each component of the color image in the wavelet field,

Pseudo-random independent generation of the mark based on a key,

Definition of all of the color vectors

For each coordinate of the passing band components:
Definition of 2 reference vectors and one vector which will bear the watermark (the reference vectors are the vectors which are the furthest away, the mark is thus applied to the "central" vector, which minimizes the visual impact)

Definition of a rule which controls the marking force and determines the insertion space associated to the bit 1 and bit 0.

Reconstruction of the color image marked by the wavelet transformation, taking into account the modifications by marking of the wavelet coefficients.

These various operations are described in greater detail further on in the document, in relation to the figures.

1. Wavelet Transformation

The first step implemented according to the invention is a wavelet transformation step. A reminder is made that the wavelet transformation is a powerful mathematical tool allowing a multi-resolution analysis of a function, as described by Mallat S. (in *"A Theory for Multi-resolution Signal Decomposition: the Wavelet Representation"*, IEEE Transactions on Pattern Analysis and Machine Intelligence, Vol. 11, No. 7, July 1989, pp. 674-693), by Stollnitz E. J., DeRose T. D., et Salesin D. (in *"Wavelets for Computer Graphics: A Primer-Part 1"*, IEEE Computer Graphics and Applications, May 1995, pp. 76-84 or again in *"Wavelets for Computer Graphics: A Primer-Part 2"*, IEEE Computer Graphics and Applications, July 1995, pp. 75-85).

Appendix 1, which is an integral part of this patent application, makes a reminder of the essential aspects of the wavelet theory.

In the scope of the invention, the functions considered are digital images, which is to say discrete bi-dimensional functions. With no loss of general features, it is supposed that the processed images are sampled on a discrete grid of n lines and m columns and at a value in a luminance space sampled at 256 values. Furthermore, it is supposed that $n=2^k (k \in Z)$ and that $m=2^l (l \in Z)$.

If we note that I the original image, this therefore gives:

$$I: \begin{vmatrix} [0,m] \times [0,n] \rightarrow [0,255] \\ (x,y) \mapsto I(x,y) \end{vmatrix}.$$

Figure 1:
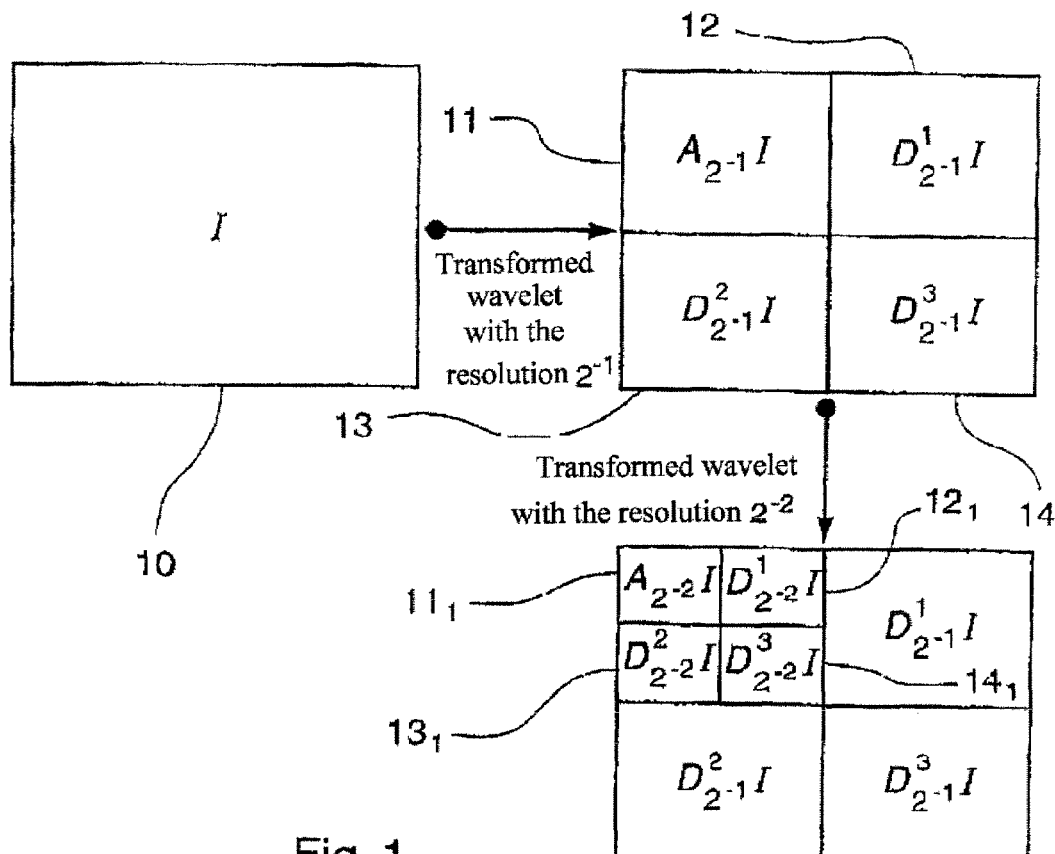
FIG. 1 shows a block diagram of the multi-resolution analysis principle for an image I by wavelet transformation, implemented according to the invention.

The wavelet transformation of the image I 10 makes possible a multi-resolution representation of I, as illustrated by FIG. 1. At each level of resolution $2^j (j \leq -1)$, the representation of I 10 is provided by a rough image $A_{2^j}I$ 11 and by three detailed images $D_{2^j}^1 I$ 12, $D_{2^j}^2 I$ 13 and $D_{2^j}^3 I$ 14. Each of these images is of the size $2^{k+j} \times 2^{l+j}$.

Again, at the following level of resolution, the rough image $A_{2^j}I$ 11 may be represented by a rough image $A_{2^{j-1}}I$ 11$_1$ and by three detailed images $D_{2^{j-1}}^1 I$ 12$_1$, $D_{2^{j-1}}^2 I$ 13$_1$, and $D_{2^{j-1}}^3 I$ 14$_1$.

The wavelet transformation requires the selection of a scale function $\Phi(x)$ as well as the selection of a wavelet function $\Psi(x)$. Based on these two functions, we derive a scale filter H and a wavelet filter G whose respective pulse responses h and g are defined by:

$$h(n) = (\phi_{2^{-1}}(u), \phi(u-n)) \forall n \in Z$$

$$g(n) = (\psi_{2^{-1}}(u), \phi(u-n)) \forall n \in Z.$$

Let us note respectively $\tilde{H}$ and $\tilde{G}$ the mirror filters of H and G (i.e. $\tilde{h}(n)=h(-n)$ and $\tilde{g}(n)=g(-n)$).

Figure 2:
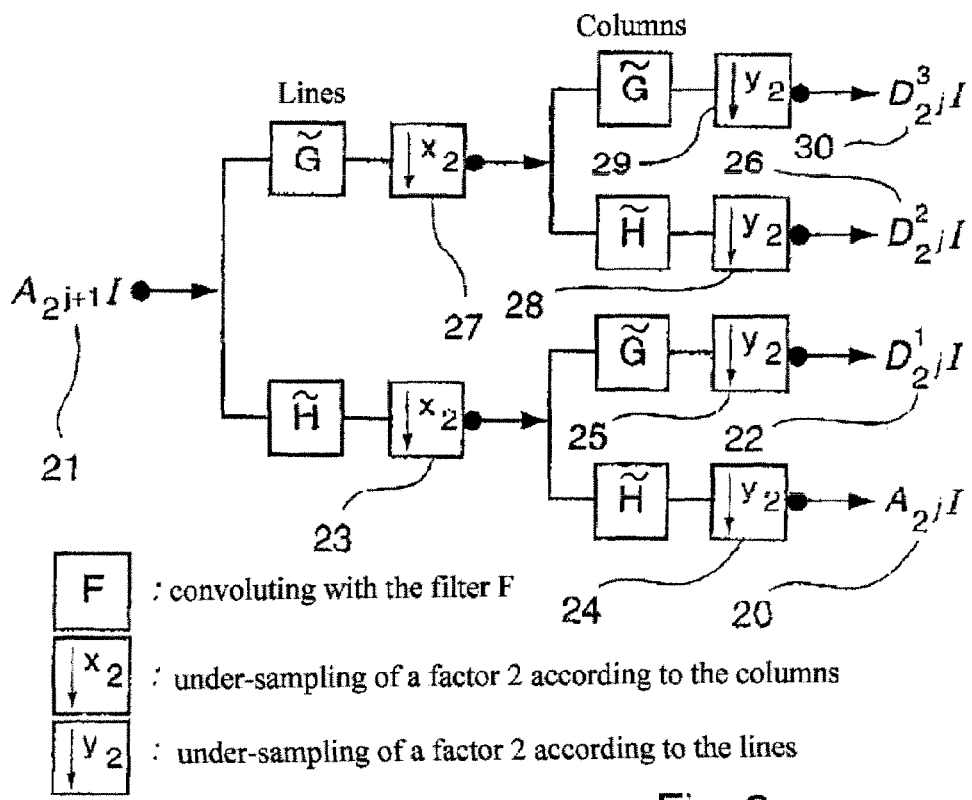
FIG. 2 illustrates the principle for obtaining images at resolution j level from the image scale at level j+1 by wavelet transformation, according to the principle of FIG. 1.

We can therefore show, as illustrated by FIG. 2, that:

$A_{2^j}I$ 20 can be calculated by convoluting $A_{2^{j+1}}I$ 21 with $\tilde{H}$ in both dimensions and by sub-sampling a factor two (23, 24) in both dimensions;

$D_{2^j}^1 I$ 22 can be calculated by:
1. convoluting $A_{2^{j+1}}I$ 21 with $\tilde{H}$ in the y direction and by sub-sampling a factor two (23) in this same direction;
2. convoluting the result of step 1) with $\tilde{G}$ in the x direction and by sub-sampling a factor two (25) in this same direction.

$D_{2^j}^2 I$ 26 can be calculated by:
1. convoluting $A_{2^{j+1}}I$ 21 with $\tilde{G}$ in the y direction y and by sub-sampling a factor two (27) in this same direction;
2. convoluting the result of step 1) with $\tilde{H}$ in the x direction and by sub-sampling a factor two (28) in this same direction.

$D_{2^j}^3 I$ 30 can be calculated by:
1. convoluting $A_{2^{j+1}}I$ 21 with $\tilde{G}$ in the y direction and by sub-sampling a factor two (27) in this same direction;
2. convoluting the result of step 1) with $\tilde{G}$ in the x direction and by sub-sampling a factor two (29) in this same direction.

In one particular embodiment of the invention, the Daubechies base is used, and the level of resolution $2^r (r \leq -1)$ where $r=-4$ is selected.

Figure 3:
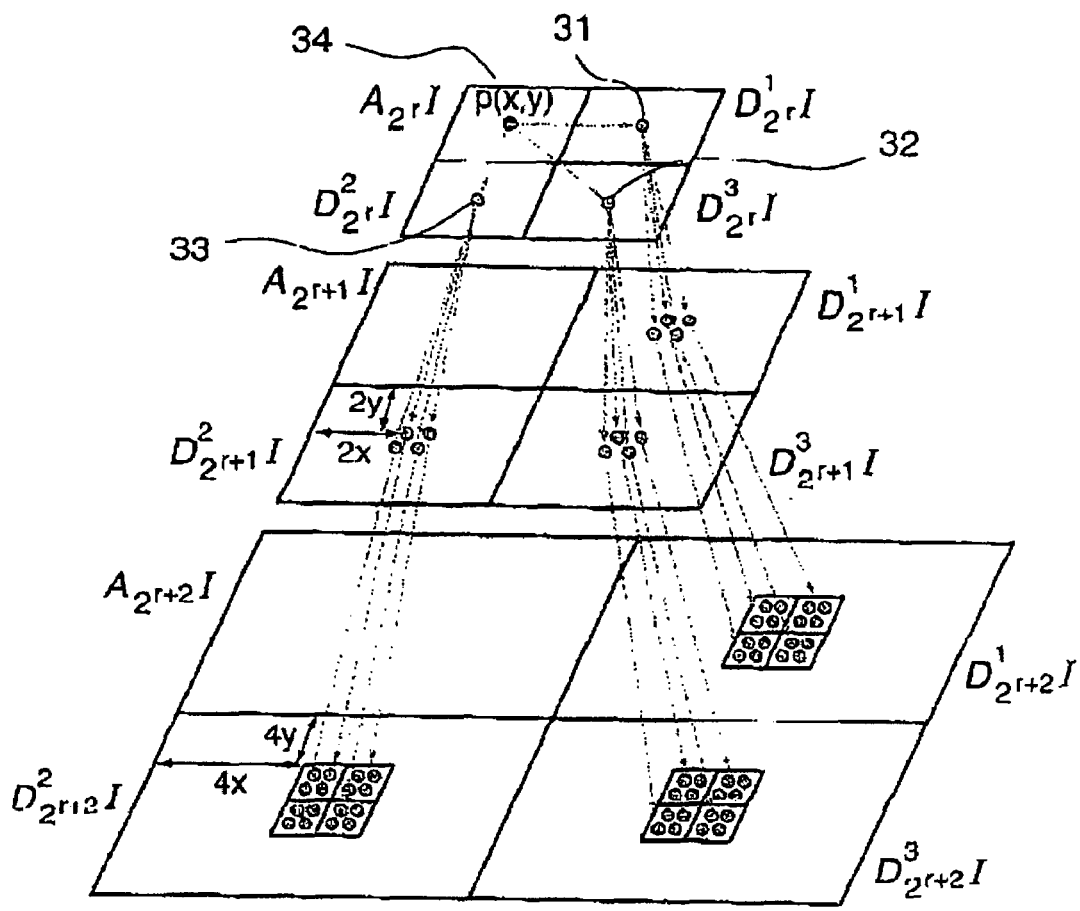
FIG. 3 describes a structure of wavelet coefficients formed after the wavelet transformation of FIG. 2; 1 shows a block diagram of the multi-resolution analysis

The Daubechies wavelets have a minimum sized support for a given number of nil moments. The compact support Daubechies wavelets are calculated from conjugated mirror filters h with finite pulse responses. The length of the filter determines the time support of the associated wavelet as well as the number of nil moments. There is no explicit formula for the Daubechies filters regardless of the order of the filter. The filters are constructed based on the resolution of the following problem:

Let $$\hat{h}(w) = \sum_{n=0}^{N-1} h[n]e^{-inw}$$

be the Fourier transformed trigonometric polynomial of the Daubechies filter, therefore a polynomial $R(e^{-iw})$ has to be constructed with a minimum degree such that $$\hat{h}(w) = \sqrt{2}\left(\frac{1+e^{-iw}}{2}\right)^P R(e^{-iw})$$

and $|\hat{h}(w)|^2 + |\hat{h}(w+\pi)|^2 = 2$. According to the invention, the filter with eight coefficients is preferred, which corresponds to the following polynomial:

$\hat{h}(w) = 0,2304 + 0,7148.e^{-iw} + 0,6309.e^{-i2w} - 0,028.e^{-i3w} - 0,187.e^{-i4w} + 0,0308.e^{-i5w} + 0,0329.e^{-i6w}0,0106.e^{-i7w}$ FIG. 3 illustrates the construction, after the wavelet transformation has been carried out to a level of minimum resolution $2^r (r \leq -1)$, of a wavelet coefficient structure:

Each pixel p(x,y) referenced 34 on the image $A_{2^r}I$ is the root of a tree structure;

Each root p(x,y) is attributed three thread knots referenced 31 to 33 designated by the wavelet coefficients on the three detailed images $D_{2^r}{}^s I$ (s=1, 2, 3) located in the same position (x,y);

Due to the sub-sampling using a factor two carried out by the wavelet transformation at each change of resolution (see FIG. 2), each wavelet coefficient $D_{2^r}{}^s(x,y)$ (s=1, 2, 3) corresponds to a zone whose size is 2×2 pixels in the detailed image corresponding to the resolution $2^{r+1}$. This zone is located in (2x,2y) and all of the wavelet coefficients belonging to it become thread knots of $D_{2^r}{}^s$ (x,y).

Recursively, the tree structure is thus constructed in which each wavelet coefficient $D_{2^u}{}^s(x,y)$ (s=1, 2, 3 et 0>u>r) has four thread knots designated by the wavelet coefficients of the image $D_{2^{u+1}}{}^s I$ located in the region situated in (2x,2y) whose size is 2×2 pixels.

Once the tree structure has been constructed, each wavelet coefficient $D_{2^r}{}^s(x,y)$ (s=1, 2, 3) corresponds to a region whose size is $2^{-r} \times 2^{-r}$ pixels in the detailed image $D_{2^{-1}}{}^s I$.

2. Construction of the Mark

A binary S signature of $N^2$ bits is generated in a pseudo-random manner, checked by a key K. This signature, written in the form of a matrix $\sqrt{N} * \sqrt{N}$ is then written in a redundant manner to obtain the mark W. The redundancy can be carried out bit by bit or signature by signature, as is illustrated in FIG. 4.

In a particular embodiment of the invention, the signature S 40 is a 16 bit binary signature and is generated in a pseudo-random manner using a key K=9. This bitmap signature (4*4) 40 is then copied T times to create a mark, as in the first example 41 shown in FIG. 4. For an image of size 256*256, knowing that the wavelet coefficients employed are those defined for the $4^{th}$ scale of decomposition, the mark will be of size 16*16. The signature is therefore repeated 16 times.

Figure 4:
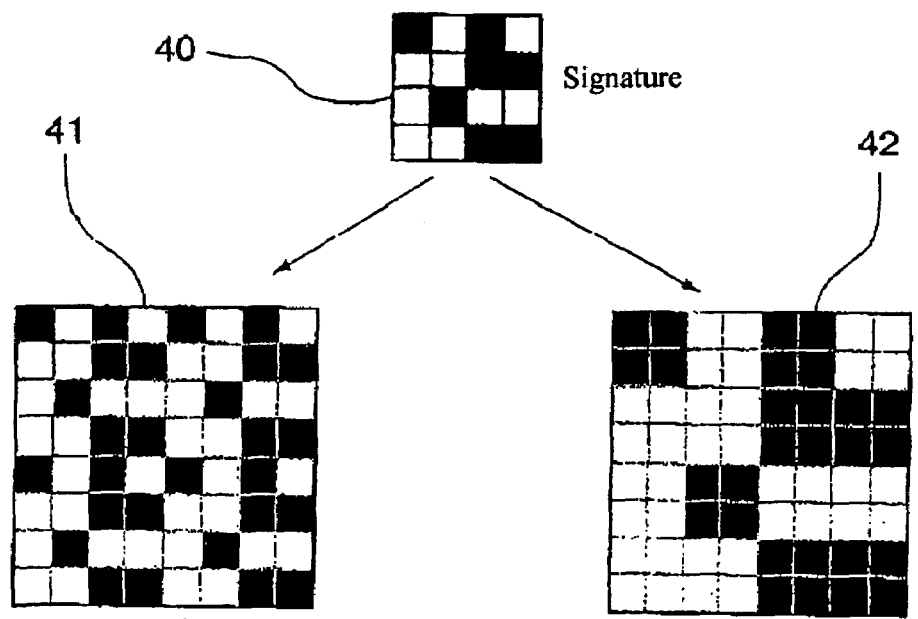
FIG. 4 illustrates the generation of a mark by redundancy of the signature.

We note that in FIG. 4, the black squares illustrate a bit by 1 and the white squares a bit by 0.

3. Insertion of the Mark 3.1 Definition of the Vectors

The vectors are defined from the decomposition into wavelets at the scale −r, for each co-ordinate (x,y) of the three detailed images $D_{2^j}{}^1 I$ 22, $D_{2^j}{}^2 I$ 26, $D_{2^j}{}^3 I$ 30, and for each of the three designated colored components I={A, B, C}.

A, B and C are components that depend on the representation space (ABC can be RGB, XYZ, YUV, etc.).

Figure 5:
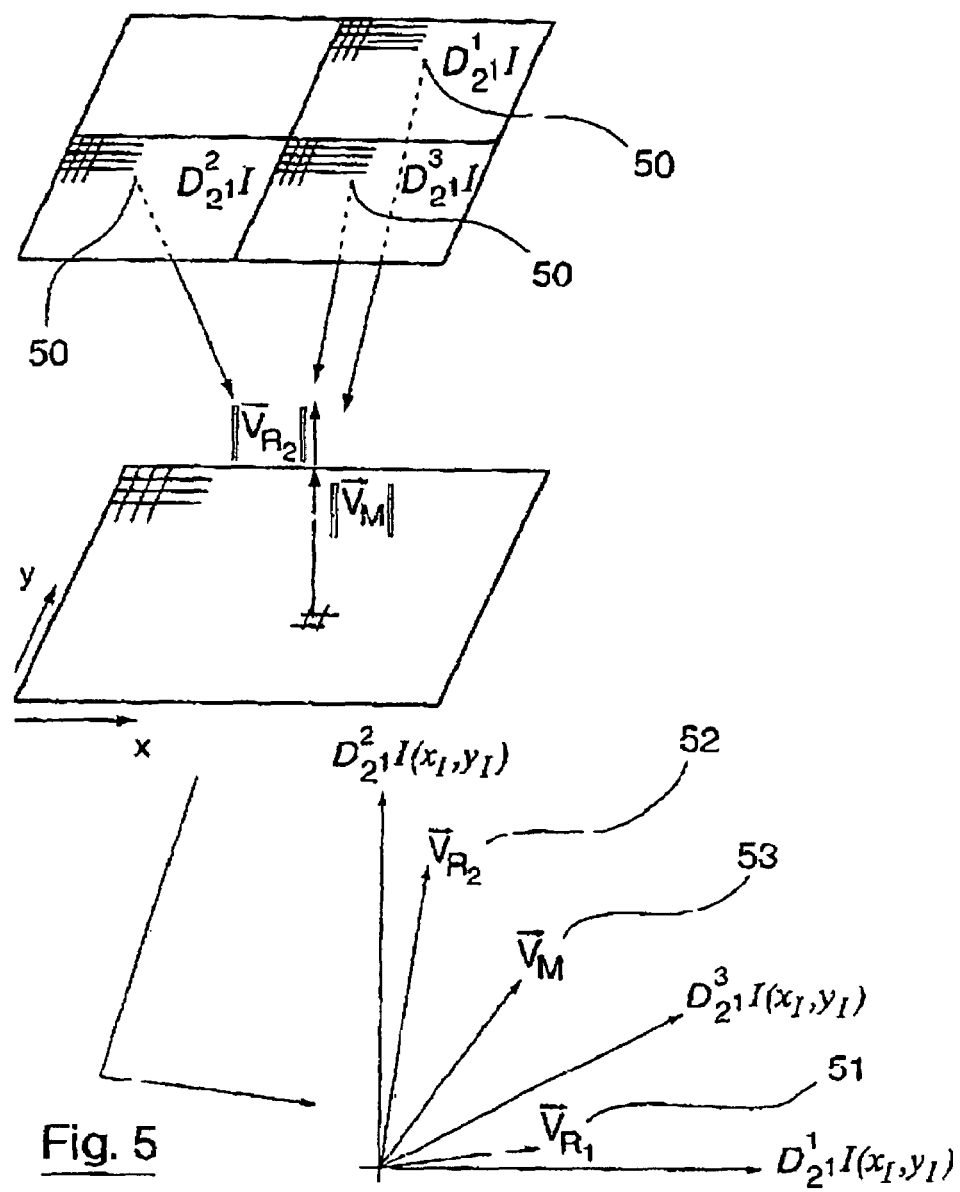
FIG. 5 presents the construction step of the reference vectors and the marking vector.

We thus obtain, for each co-ordinate (x,y) 50 of the detailed images, the following three vectors, illustrated in FIG. 5:

$$\vec{V}_A(x, y) = \{D_{2^j}^1 A(x, y), D_{2^j}^2 A(x, y), D_{2^j}^3 A(x, y)\},$$

$$\vec{V}_B(x, y) = \{D_{2^j}^1 B(x, y), D_{2^j}^2 B(x, y), D_{2^j}^3 B(x, y)\},$$

$$\vec{V}_C(x, y) = \{D_{2^j}^1 C(x, y), D_{2^j}^2 C(x, y), D_{2^j}^3 C(x, y)\}.$$

In a particular embodiment of the invention, we examine the image in the representation space RGB, and the vectors are defined for each component (R, G and B) from the wavelet coefficients of the $4^{th}$ scale of decomposition (r=4):

$$\vec{V}_R(x, y) = \{D_{2^{-4}}^1 R(x, y), D_{2^{-4}}^2 R(x, y), D_{2^{-4}}^3 R(x, y)\},$$

$$\vec{V}_G(x, y) = \{D_{2^{-4}}^1 G(x, y), D_{2^{-4}}^2 G(x, y), D_{2^{-4}}^3 G(x, y)\},$$

$$\vec{V}_B(x, y) = \{D_{2^{-4}}^1 B(x, y), D_{2^{-4}}^2 B(x, y), D_{2^{-4}}^3 B(x, y)\}$$

3.2 Calculation of Distances, Reference Vectors and Marked Vectors

For each co-ordinate of the detailed images, the distances between any two vectors are calculated:

$$D_{A,B}(x, y) = |\vec{V}_A(x, y) - \vec{V}_B(x, y)|$$

$$D_{A,C}(x, y) = |\vec{V}_A(x, y) - \vec{V}_C(x, y)|$$

$$D_{B,C}(x, y) = |\vec{V}_B(x, y) - \vec{V}_C(x, y)|$$

The greatest distance is defined by the two reference vectors $\vec{V}_{R_1}$ 51 and $\vec{V}_{R_2}$ 52 (see FIG. 5). It is the third vector $\vec{V}_M$ 53 which will be marked.

Thus, if $D_{A,B}(x,y) > D_{A,C}(x,y)$ and $D_{A,B}(x,y) > D_{B,C}(x,y)$, then $\vec{V}_A(x,y)$ and $\vec{V}_B(x,y)$ are the reference vectors and $\vec{V}_C(x,y)$ is the vector which will bear the mark.

If $D_{A,C}(x,y) > D_{A,B}(x,y)$ and $D_{A,C}(x,y) > D_{B,C}(x,y)$, then $\vec{V}_A(x,y)$ and $\vec{V}_C(x,y)$ are the reference vectors and $\vec{V}_B(x,y)$ is the vector which will bear the mark.

If $D_{B,C}(x,y) > D_{A,B}(x,y)$ and $D_{B,C}(x,y) > D_{A,C}(x,y)$, then $\vec{V}_B(x,y)$ and $\vec{V}_C(x,y)$ are the reference vectors and $\vec{V}_A(x,y)$ is the vector which will bear the mark.

In a particular embodiment of the invention, the distances between the vectors are calculated, between any two, for each of the 256 possible co-ordinates (16*16 wavelet coefficients in the detailed images).

$$D_{R,G}(x, y) = |\vec{V}_R(x, y) - \vec{V}_G(x, y)|$$

$$D_{R,B}(x, y) = |\vec{V}_R(x, y) - \vec{V}_B(x, y)|$$

$$D_{G,B}(x, y) = |\vec{V}_G(x, y) - \vec{V}_B(x, y)|$$

If $D_{R,G}(x,y) > D_{R,B}(x,y)$ and $D_{R,G}(x,y) > D_{G,B}(x,y)$, then $\vec{V}_R(x,y)$ and $\vec{V}_G(x,y)$ are the reference vectors and $\vec{V}_B(x,y)$ the vector which will bear the mark.

If $D_{R,B}(x,y) > D_{R,G}(x,y)$ and $D_{R,B}(x,y) > D_{G,B}(x,y)$, then $\vec{V}_R(x,y)$ and $\vec{V}_B(x,y)$ are the reference vectors and $\vec{V}_G(x,y)$ the vector which will bear the mark.

If $D_{G,B}(x,y) > D_{R,G}(x,y)$ and $D_{G,B}(x,y) > D_{R,B}(x,y)$, then $\vec{V}_G(x,y)$ and $\vec{V}_B(x,y)$ are the reference vectors and $\vec{V}_R(x,y)$ the vector which will bear the mark.

3.3 Definition and Choice of the Marking Agreement

For each co-ordinate of the detailed images, we try to know the number of times the vectors $\vec{V}_A(x,y)$, $\vec{V}_B(x,y)$ and $\vec{V}_C(x,y)$ are used as references. This stage thus allows to choose the best agreement for the insertion operation (see FIGS. 6a to 6c), in order to minimize the conflict which will be explained in fuller detail in §3.5.

Figure 6A:
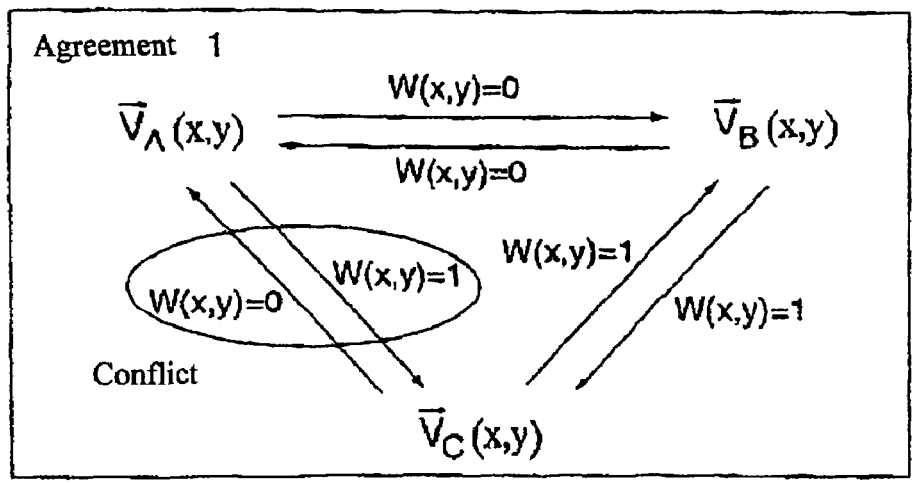
FIGS. 6a to 6c illustrate the various marking conventions used according to the invention.
Figure 6B:
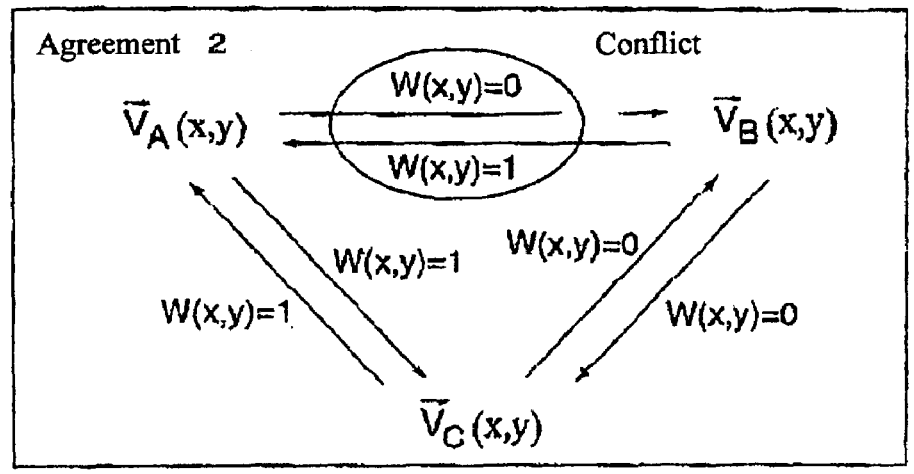
Figure 6C:
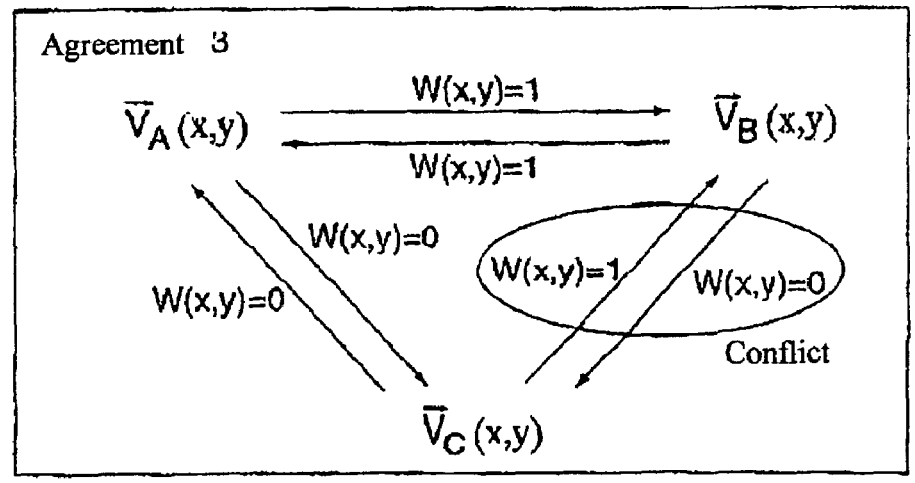

If $\vec{V}_A(x,y)$ is the least used vector as a reference, the choice will be for agreement 3, illustrated in FIG. 6c.

If $\vec{V}_B(x,y)$ is the least used vector as a reference, the choice will be for agreement 1, illustrated in 6a.

If $\vec{V}_C(x,y)$ is the least used vector as a reference, the choice will be for agreement 2, illustrated in FIG. 6b.

Figure 8A:
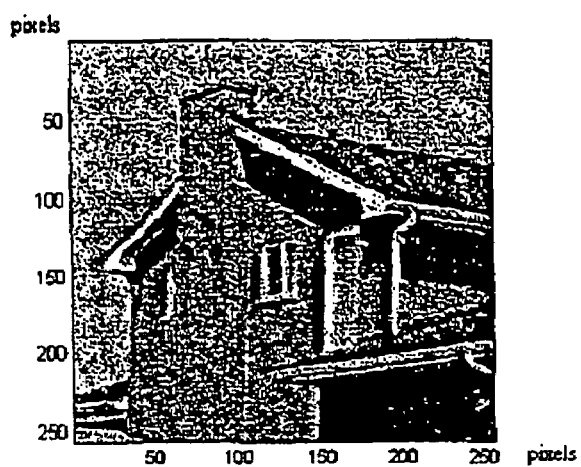
FIGS. 8a and 8b respectively present an example of an original image and a corresponding image marked using the watermarking technique of the invention.

Thus, in case of the "Home" image illustrated in FIGS. 8a (original image) and 8b (marked image), the vector $\vec{V}_R(x,y)$ is used 235 times as a reference vector, the vector $\vec{V}_G(x,y)$ 108 times and the vector $\vec{V}_B(x,y)$ 169 times. To minimize the conflicts, we therefore use agreement 1, shown in FIG. 6a.

However, it is recommended to make a precise choice in the case of small images. The automatic choice of the marking agreement is better adapted to large size images (at least several thousand pixels).

3.4 Insertion Operation

Marking consists in modifying the vector by placing its end nearer to the end of one of the two reference vectors, on the basis of the value of the mark (0 or 1), and this being for each co-ordinate 50, as is illustrated in FIG. 5. We note $\vec{V}_{R1}(x,y)$ and $\vec{V}_{R2}(x,y)$ (51 and 52) as the reference vectors and $\vec{V}_M(x,y)$ as the vector to be marked 53.

Generally speaking, the marking is in the form of:

$$\vec{V}_{M,W}(x,y) = \vec{V}_R(x,y) - (1-F_M)(\vec{V}_R(x,y) - \vec{V}_M(x,y)) \quad (1)$$

with depending on the case: $\vec{V}_R = \vec{V}_{R1}$ or $\vec{V}_R = \vec{V}_{R2}$ according to the value of M and the chosen agreement.

$F_M$ represents the marking force applied to the vector with $M = \{A, B, C\}$. The marking force can thus be adapted according to the local characteristics (colorimetric or texture) of the image.

Figure 7:
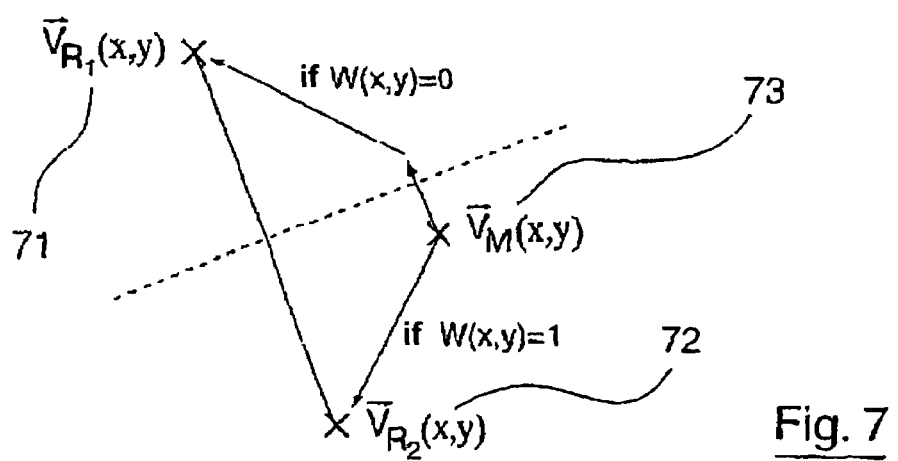
FIG. 7 illustrates one possible example of the position of the original vectors, as well as the two marking vector movements that can be envisaged for this case.

Two possible situations could develop, as is illustrated for a particular case in FIG. 7.

Depending on the chosen agreement and the value of the mark $W(x,y)$:

the vector $\vec{V}_M(x,y)$ 73 is already in the correct half space where $\vec{V}_{M,W}(x,y)$ must be positioned. In this case, the formula (1) can be directly applied to $\vec{V}_M(x,y)$ 73. This case is illustrated in FIG. 7, in consideration of the particular case where $W(x,y)=1$, and where the agreement imposes that $\vec{V}_{M,W}(x,y)$ is in the half space containing $\vec{V}_{R2}(x,y)$ 72.

the vector $\vec{V}_M(x,y)$ 73 is not in the correct half space where $\vec{V}_{M,W}(x,y)$ must be positioned. In this case, prior to applying the formula (1) to $\vec{V}_M(x,y)$ 73, the position of the end of this vector must be modified. To do so, this end must be displaced in a collinear direction to the vector $\vec{V}_{col}(x,y) = \vec{V}_{R1}(x,y) - \vec{V}_{R2}(x,y)$, for a distance $(D_m + \epsilon)$, where $D_m$ is equivalent to the distance between $\vec{V}_M(x,y)$ 73 and $(P_M)$ (where $P_M$ is the border between the two half spaces associated to each of the reference vectors (71 and 72). Preferably we choose $\epsilon$ equals 10% of $D_m$, so that $\vec{V}_M(x,y)$ 73 does not get confused with $(P_M)$. This case is illustrated in FIG. 7, in consideration of the particular case where $W(x,y)=0$, and where the agreement imposes that $\vec{V}_{M,W}(x,y)$ is in the half space containing $\vec{V}_{R1}(x,y)$ 71.

We note that the case where $F_M=0$, the marking is of minimal robustness. The vector $\vec{V}_M(x,y)$ 73 becomes $\vec{V}_{M,W}(x,y)$, by simply displacing it (if necessary) in the half space corresponding to the positions of the reference vectors 71 and 72, the value of the mark and the chosen agreement. The image is thus degraded to the minimum.

In the case where $F_M=1$, the marking force is at the maximum. The mark is very robust, but has a high probability of being visible. $\vec{V}_{M,W}(x,y)$ thus becomes confused with one of the reference vectors 71 and 72 on the basis of the previously indicated situation.

The fact of choosing an intermediary value of $F_M$ allows to control the compromise between the invisibility and the robustness of the mark.

3.5 Conflict

The marking agreement diagrams define the direction of the marking for each of the possible situations. In the case where the marking force $F_M=1$, that being at the maximum, the marked vector becomes equal to a reference vector.

Thus, in FIGS. 6a to 6c, we note that, for each of the agreements, the bits of the mark are opposite for one of the branches of the agreement triangles. A conflict is thus possible. Indeed, during the transmission of the marked image or the processes it can undergo, the two confused vectors can be substantially modified. It is therefore possible that the reference vector becomes the marked vector and vice versa.

During the detection of the mark (which will be described in fuller detail in §5 below), detection errors can thus be integrated due to this conflict. The conflict is minimized if the chosen agreement minimizes this situation. The agreement choice stage proposed in §4.3 above is therefore particularly important.

In the case of a conflict, the marking operation becomes:

$$\vec{V}_{M,W}(x,y) = \vec{V}_R(x,y) - \text{beta}.(1-F_M)(\vec{V}_R(x,y) - \vec{V}_M(x,y))$$

where beta<1.

Thus the choice of the agreement allows to minimize the number of conflicts, and the errors due to the conflicts are thus also minimized through applying a beta factor in the marking operation.

In a particular embodiment of the invention, the marking forces employed are the following: $F_R$=0.4 (for the red component); $F_G$=0.4 (for the green component); $F_B$=0.8 (for the blue component), with beta=0.9 (in the case of a conflict).

3.6 Reconstruction of the Image

Figure 8B:
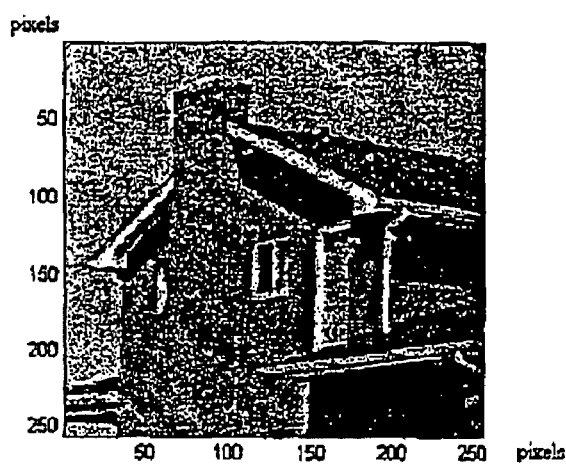
Figure 10:
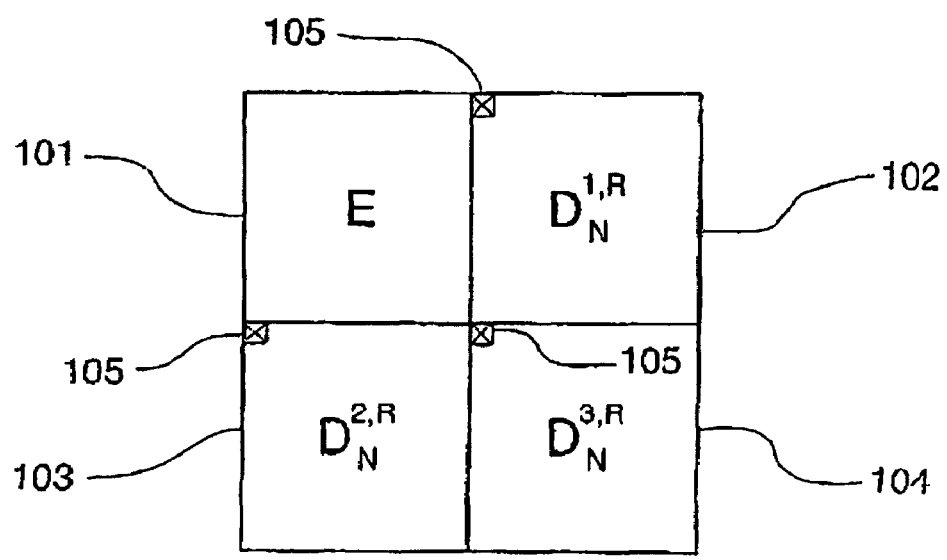
FIG. 10 states the notion of "point" of an image, which represents, as part of a wavelet transformation, a pixel position in a breakdown level.

The image is then reconstructed by transformation into inverse wavelets, taking into account the coefficients modified by the marking. Thus, FIG. 8b illustrates the marked "home" image, reconstructed by transforming into inverse wavelets, and FIG. 8a shows the same image prior to marking.

4. Detection of the Mark

From now on we will describe the different operations implemented when we try to detect a mark in a watermarked color image according to the invention. Indeed, after processing the image (transmission, JPEG compression, median filtration or noise addition) the mark can be detected.

4.1 Decomposition Into Wavelets

The decomposition operation in the field of wavelets of the marked image is identical to that carried out in the context of marking, shown in §1 above.

4.2 Definition of Vectors and Choice of Agreement

Likewise, the operations for defining vectors and the choice of marking agreement are identical to those previously described in §3.1, 3.2 and 3.3.

4.3 Recuperation of a Bit of the Detected Mark

For each co-ordinate, we check the proximity between the marked vector and the two reference vectors. Depending on the chosen agreement, it is possible to recognize the value of the integrated bit. The table below shows all the possible situations in the reconstruction of the mark. The mark is thus reconstructed bit by bit.

|  | convention 1 | convention 2 | convention 3 |
|---|---|---|---|
| $\|\vec{V}_A(x,y) - \vec{V}_B(x,y)\| < \|\vec{V}_A(x,y) - \vec{V}_C(x,y)\|$ | 0 | 0 | 1 |
| $\|\vec{V}_A(x,y) - \vec{V}_C(x,y)\| < \|\vec{V}_A(x,y) - \vec{V}_B(x,y)\|$ | 1 | 1 | 0 |
| $\|\vec{V}_B(x,y) - \vec{V}_A(x,y)\| < \|\vec{V}_B(x,y) - \vec{V}_C(x,y)\|$ | 0 | 1 | 1 |
| $\|\vec{V}_B(x,y) - \vec{V}_C(x,y)\| < \|\vec{V}_B(x,y) - \vec{V}_A(x,y)\|$ | 1 | 0 | 0 |
| $\|\vec{V}_C(x,y) - \vec{V}_A(x,y)\| < \|\vec{V}_C(x,y) - \vec{V}_B(x,y)\|$ | 0 | 1 | 0 |
| $\|\vec{V}_C(x,y) - \vec{V}_B(x,y)\| < \|\vec{V}_C(x,y) - \vec{V}_A(x,y)\|$ | 1 | 0 | 1 |

4.4 Reconstruction of the Signature

The detected signature is then reconstructed from the detected mark. To do so, the mean of the bits of the mark corresponding to a coordinate of the signature is carried out, according to a principle similar to that used during the construction of the mark described in §2. Thus the detected signature $\hat{S}$ is reconstructed, bit by bit.

In other terms, we start, for each coordinate of the detailed images, by referring to the table above, which indicates the value of the inserted bit, for each of the agreements in FIGS. 6a to 6c, according to the distances between the vectors.

In a particular embodiment of the invention, the signature $\hat{S}$ of 16 bits is the reconstructed by calculating the mean of the 16 values of the mark for each of the corresponding coordinates, according to the form of the redundancy defined in §2.

4.5 Recognizing the Marked Signature Compared to the Initial Signature

The correspondence rate between the initial signature and the detected signature remains to be defined. To do so, we perform the correlation calculation between the two signatures S and $\hat{S}$ using the following operation:

$$cc(S, \hat{S}) = \frac{\sum S(x,y) * \hat{S}(x,y)}{\sqrt{\sum S^2 x, y} \sqrt{\sum \hat{S}^2 x, y}}$$

The two signatures correspond if $cc(S,\hat{S}) \geq T$, where T is the decision threshold of the correspondence of the signatures.

This correlation calculation allows to define the resemblance rate between the original signature S and the detected signature $\hat{S}$. In this particular embodiment of the invention, we set the threshold T to 0.7, so that we consider that if $cc(S,\hat{S}) \geq 0.7$, the detected signature corresponds to the original signature.

As previously indicated, the FIGS. 8a and 8b show an original image, and the corresponding marked image, according to the parameters of the particular embodiment of the invention shown above.

Figure 9A:
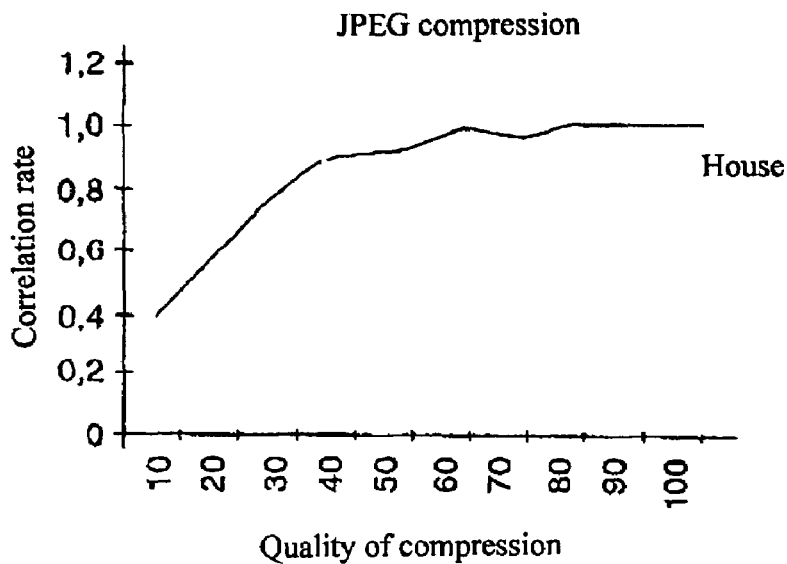
FIGS. 9a to 9c present, in the form of graphs, the results of resistance tests of the watermarking technique of the invention, on the example of the image of FIG. 8b.
Figure 9B:
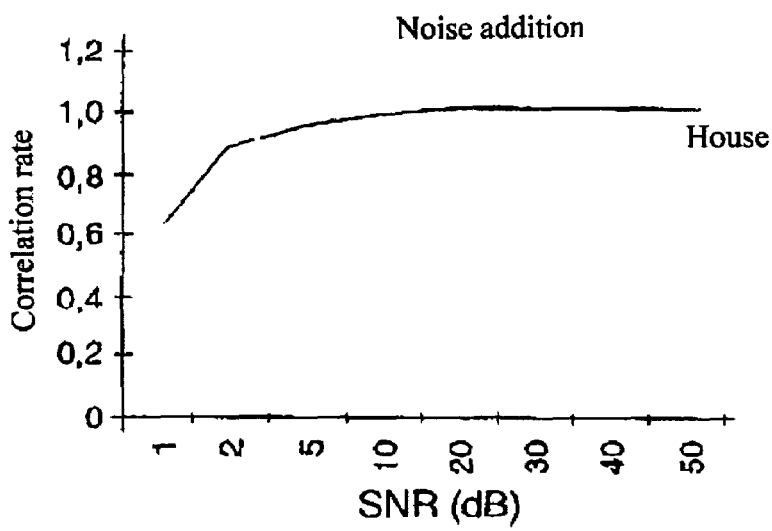
Figure 9C:
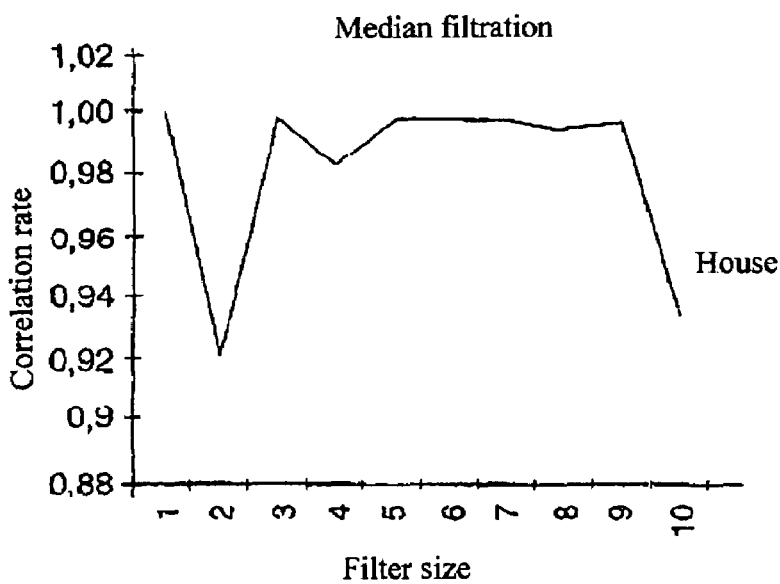

FIGS. 9a to 9c illustrate, in the form of graphs, the results of tests of robustness of the mark inserted into the "home" image in FIGS. 8a and 8b.

The graphs in FIGS. 9a to 9c respectively correspond to the tests of the mark under attack from JPEG compression, from noise addition and from median filtration, and represent the mean of 20 measurements (use of 20 different keys K) for each attack. As can be seen, the results are stable, and the robustness of the watermarking technique of the invention against these attacks is very good.

Although the present invention has been described with reference to preferred embodiments, workers skilled in the art will recognize that changes may be made in form and detail without departing from the spirit and scope of the invention.

APPENDIX 1

Reminder on the Theory of Wavelets

1. Introduction

The theory of wavelets allows to approximate a function (curve, surface, etc.) with different resolutions. Thus, this theory allows to describe a function in the form of a rough approximation and of a series of details allowing to perfectly reconstruct the original function.

Such a multi-resolution representation (Mallat S., *"A Theory for Multiresolution Signal Decomposition: the Wavelet Representation"*, IEEE Transactions on Pattern Analysis and Machine Intelligence, Vol. 11, No. 7, July 1989, pp. 674-693.) of a function thus allows to interpret in a hierarchic manner the information held in the function. To do so, this information is reorganized and a set of details appear with different resolutions. Starting from a sequence of increasing resolutions $(r_j)_{j \in Z}$, the details of a function with a resolution $r_j$ are defined as the difference of information between its approximation with the resolution $r_j$ and its approximation with the resolution $r_{j+1}$.

2. Annotations

Before presenting the foundation of the multi-resolution analysis in fuller detail, we will present the annotation used in this section.

The sets of integral and real numbers are respectively marked Z and R.

$L^2(R)$ designates the vectorial space of the measurable and integrable one-dimensional functions f(x).

For $f(x) \in L^2(R)$ and $g(x) \in L^2(R)$, the scalar product of f(x) and g(x) is defined by:

$$\langle f(x), g(x) \rangle = \int_{-\infty}^{+\infty} f(u)g(u)du.$$

For $f(x) \in L^2(R)$ and $g(x) \in L^2(R)$, the convolution of f(x) and g(x) is defined by:

$$f * g(x) = \int_{-\infty}^{+\infty} f(u)g(x-u)du.$$

$L^2(R^2)$ designates the vectorial space of the functions f(x, y) of two measurable and integrable variables.

For $f(x,y) \in L^2(R^2)$ and $g(x,y) \in L^2(R^2)$, the scalar product of f(x,y) and g(x,y) is defined by:

$$\langle f(x, y), g(x, y) \rangle = \int_{-\infty}^{+\infty} \int_{-\infty}^{+\infty} f(u, v)g(u, v)dudv.$$

3. Properties of the Multi-resolution Analysis

In this section, we present in an intuitive manner the properties desired by the operator allowing to perform a multi-resolution analysis of the function. These properties are drawn from work by Mallat S., in *"A Theory for Multiresolution Signal Decomposition: the Wavelet Representation"*, IEEE Transactions on Pattern Analysis and Machine Intelligence, Vol. 11, No. 7, July 1989, pp. 674-693.

Let $A_{2^j}$ be the operator which approximates a function $f(x) \in L^2(R)$ with the resolution $2^j (j \geq 0)$ (i.e. f(x) is defined by $2^j$ samples).

The expected properties of $A_{2^j}$ are the following:

1. $A_{2^j}$ is a linear operator. If $A_{2^j}f(x)$ represents the approximation of f(x) with the resolution $2^j$, then $A_{2^j}f(x)$ must not be modified when a new approximation is made with the resolution $2^j$. This principle is written $A_{2^j} \circ A_{2^j} = A_{2^j}$ and shows that the operator $A_{2^j}$ is a projection operator in the vectorial space $V_{2^j} \subset L^2(R)$. This vectorial space can be interpreted as the set of all the possible approximations with the resolution $2^j$ of the function of $L^2(R)$.

2. Among all the possible approximations of f(x) with the resolution $2^j$, $A_{2^j}f(x)$ is the most similar to f(x). The operator $A_{2^j}$ is therefore an orthogonal projection onto $V_{2^j}$.

3. The approximation of a function with the resolution $2^{j+1}$ contains all the information necessary to calculate the same function with the lower resolution $2^j$. This casualty property induces the following relation:

$$\forall j \in Z, V_{2^j} \subset V_{2^{j+1}}.$$

4. The approximation operation is the same with all the resolutions. The spaces of the approximated functions can be derived one from another by a change in scale corresponding to the difference in resolution:

$$\forall j \in Z, f(x) \in V_{2^j} \Leftrightarrow f(2x) \in V_{2^{j+1}}.$$

5. When we calculate an approximation of f(x) with the resolution $2^j$, a part of the information contained in f(x) is lost. However, when the resolution tends towards the infinitive, the approximated function must converge towards the original function f(x). In like manner, when the resolution tends towards zero, the approximated function contains less information and must converge towards zero.

Every vectorial space $(V_{2^j})_{j \in Z}$ which satisfies all of these properties is called approximation multi-resolution of $L^2(R)$.

4. Multi-resolution Analysis of a One-dimensional Function 4.1 Search for a Base of $V_{2^j}$ As is indicated above, the approximation operator $A_{2^j}$ is an orthogonal projection onto the vectorial space $V_{2^j}$. In order to numerically characterize this operator, an orthogonal base of $V_{2^j}$ must be found. $V_{2^j}$ being a vectorial space containing the approximations of the functions of $L^2(R)$ with the resolution $2^j$, every function $f(x) \in V_{2^j}$ can be seen as a vector with $2^j$ components. Therefore, $2^j$ basic functions must be found.

One of the principal theorems of the theory of wavelets stipulates that there is a single function $\Phi(x) \in L^2(R)$, called the scale function, from which we can define $2^j$ basic functions $\Phi_i^j(x)$ of $V_{2^j}$ via dilatation and translation of $\Phi(x)$:

$$\Phi_i^j(x) = \Phi(2^j x - i), i = 0, \ldots, 2^j - 1.$$

Approximate a function $f(x) \in L^2(R)$ with the resolution $2^j$ therefore returns to project in an orthogonal manner f(x) onto the $2^j$ basic functions $\Phi_i^j(x)$. This operation consists in calculating the scalar product of f(x) with each of the $2^j$ basic functions $\Phi_i^j(x)$:

$$A_{2^j}f(x) = \sum_{k=0}^{k=2^j-1} \langle f(u), \Phi_k^j(u) \rangle \Phi_k^j(x)$$

$$= \sum_{k=0}^{k=2^j-1} \langle f(u), \Phi(2^j u - k) \rangle \Phi(2^j u - k).$$

We can demonstrate that $A_{2^j}f(x)$ can reduce the convolution of f(x) with the low-pass filter $\Phi(x)$, evaluated at point k:

$$A_{2^j}f = (f(u) * \Phi(-2^j u))(k), k \in Z.$$

As $\Phi(x)$ is a low-pass filter, $A_{2^j}f$ can be interpreted as a low-pass filtering followed by an even under-sampling.

4.2 Construction of the Multi-resolution Analysis

In practice, the approximated functions f (signal, image, etc.) are discrete. Supposing that the original function f(x) is defined on samples $n = 2^k (k \in Z)$. The maximum resolution of f(x) is then n.

Let $A_n f$ be the discrete approximation of f(x) with the resolution n. The casualty property (see §3 above) claims that $A_{2^j}f$ can be calculated from $A_n f$ for every $j < k$.

Indeed, by calculating the projection of the $2^j$ basic functions $\Phi_i^j(x)$ of $V_{2^j}$ onto $V_{2^{j+1}}$, it can be demonstrated that $A_{2^j}f$ can be obtained by convoluting $A_{2^{j+1}}f$ with the low-pass filter corresponding to the scale function and by under-sampling the result of a factor 2:

$$A_{2^j}f(u) = \sum_{k=0}^{2^{j+1}-1} h(k-2u)A_{2^{j+1}}f(k), 0 \le u < 2^j - 1$$

with $h(n)=(\phi(2u), \phi(u-n)), \forall n \in Z$.

4.3 The Detail Function

As is mentioned in property (5) of §3, the operation which consists in approximating a function f(x) with a resolution $2^j$ from an approximation with the resolution $2^{j+1}$ generates a loss of information. This loss of information is contained in a function called a detail function with the resolution $2^j$ and designated $D_{2^j}f$. It is to be noted that the knowledge of $D_{2^j}f$ and $A_{2^j}f$ allows to perfectly reconstruct the approximated function $A_{2^{j+1}}f$.

The detail function with the resolution $2^j$ is obtained by projecting in an orthogonal manner the original function f(x) onto the orthogonal complement of $V_{2^j}$ in $V_{2^{j+1}}$. Let $W_{2^j}$ be this vectorial space.

To numerically calculate this projection, an orthogonal base of $W_{2^j}$ must be found, i.e. $2^j$ basic functions. Another major theorem of the theory of wavelets stipulates that from a scale function $\Phi(x)$, it is possible to define $2^j$ basic functions of $W_{2^j}$. These basic functions $\Psi_i^j(x)$ are obtained by dilatation and translation of a function $\Psi(x)$ called wavelet function:

$$\Psi_i^j(x)=\Psi(2^j x-i), i=0,\ldots,2^j-1.$$

In the same manner as for the construction of the approximation $A_{2^j}f$, we can demonstrate that $D_{2^j}f$ can be obtained by convoluting the original function f(x) with the high-pass filter $\Psi(x)$ followed by an under-sampling of a factor $2^j$:

$$D_{2^j}f=(f(u)*\Psi(-2^j u))(k), k \in Z.$$

4.4 Extension of the Multi-resolution Analysis of Two-dimensional Functions

In this section, we present the method of extending the multi-resolution analysis by wavelets to the $L^2(R^2)$ functions of as the images. To do so, we use the same theorems as those previously used. Thus, if we designate $V_{2^j}$ the vectorial space of the approximations of $L^2(R^2)$ with the resolution $2^j$, we can demonstrate that an orthonormal base of $V_{2^j}$ can be found by dilating and translating a scale function $\Phi(x,y) \in L^2(R^2)$:

$$\Phi_i^j(x,y)=\Phi(2^j x-i, 2^j y-j),(i,j) \in Z^2.$$

In the particular case of separable approximations of $L^2(R^2)$, we have $\Phi(x,y)=\Phi(x)\Phi(y)$ where $\Phi(x)$ is a scale function of $L^2(R)$. In this case, the multi-resolution analysis of a function of $L^2(R^2)$ is carried out by processing in a sequential and separable manner each of the dimensions x and y.

As in the one-dimensional case, the detail function with the resolution $2^j$ is obtained by an orthogonal projection of f(x,y) onto the complement of $V_{2^j}$ in $V_{2^{j+1}}$, designated $W_{2^j}$. In the two-dimensional case, we can demonstrate that if we designate $\Psi(x)$ the wavelet function associated with the scale function $\Phi(x)$, then the three functions defined by:

$$\Psi^1(x,y) = \Phi(x)\Psi(y)$$

-continued $$\Psi^2(x,y) = \Psi(x)\Phi(y)$$

$$\Psi^3(x,y) = \Psi(x)\Psi(y)$$

are wavelet functions of $L^2(R^2)$. By dilating and translating these three wavelet functions, we obtain an orthonormal base of $W_{2^j}$:

$$\Psi^1(x,y) = \Phi\Psi(2^j x-k, 2^j y-l)$$

$$\Psi^2(x,y) = \Psi\Phi(2^j x-k, 2^j y-l)$$

$$\Psi^3(x,y) = \Psi\Psi(2^j x-k, 2^j y-l).$$

The projection of f(x,y) onto these three functions of the base $W_{2^j}$ give three detail functions:

$$D_{2^j}^1 f = f(x,y) * \Phi^j(-x)\Psi_j(-y)$$

$$D_{2^j}^2 f = f(x,y) * \Psi^j(-x)\Phi_j(-y)$$

$$D_{2^j}^1 f = f(x,y) * \Psi^j(-x)\Psi_j(-y)$$

What is claimed is:

1. Method of watermarking a color image that has at least three components, wherein the method comprises:
   a computer performing:
   an insertion step of a mark of watermarking, on at least one point of the image, according to an insertion rule taking into account the relative position of three component vectors associated to said at least one point,
   wherein, for each of said related points, the method comprises:
      a step of calculating the distance between any two vectors of said at least three vectors,
      a step of selecting two vectors as reference vectors and one vector to be marked in order to bear said mark of watermarking, said reference vectors being those the furthest away from each other, and
      said vector to be marked is a central vector, positioned between said reference vectors.

2. Method of watermarking set forth in claim 1, characterized in that a border is set between said reference vectors, defining two zones respectively associated to binary values "0" and "1".

3. Method of watermarking set forth in claim 2, characterized in that said border is set by the bisector between said reference vectors.

4. Method of watermarking set forth in claim 3, characterized in that said marking is, at least under normal circumstances, calculated according to the following equation:

$$\vec{V}_{M,W}(x,y) = \vec{V}_R(x,y) - (1-F_M)(\vec{V}_R(x,y) - \vec{V}_M(x,y))$$

where $\vec{V}_M(x,y)$ is said vector to be marked, $\vec{V}_R(x,y)$ is one of said reference vectors, $F_M$ is said marking force and $\vec{V}_{M,W}(x,y)$ is said marked vector.

5. Method of watermarking set forth in claim 4, characterized in that at least two marking agreements for a vector are provided and that, in the event of a conflict, said marking is calculated according to:

$\vec{V}_{M,W}(x,y) = \vec{V}_R(x,y) - \text{beta} \cdot (1-F_M)(\vec{V}_R(x,y) - \vec{V}_M(x,y))$, where beta<1.

6. Method of watermarking set forth in claim 2, characterized in that the marking of said vector to be marked comprises a possible shift of said vector to be marked in one of said zones, according to the binary value for marking to be applied.

7. Method of watermarking set forth in claim 6, characterized in that said shift has a variable amplitude, according to a marking strength chosen in accordance to at least one local characteristic of said image.

8. Method of watermarking set forth in claim 2, characterized in that the marking of said vector to be marked comprises a possible shift of said vector to be marked towards one or other of said reference vectors, according to the binary marking value to be applied.

9. Method of watermarking set forth in claim 1, characterized in that it also comprises a transformation step into wavelets of each of said components of the image, and in that said at least three component vectors are set, for each point of at least one level of decomposition of said transformation into wavelets, for each of said components respectively.

10. Method of watermarking set forth in claim 9, characterized in that it comprises, after said step of associating a mark of watermarking, a transformation step into inverse wavelets, issuing a marked image.

11. Method of watermarking set forth in claim 1, characterized in that at least two marking agreements for a vector are provided.

12. Method of watermarking set forth in claim 11, characterized in that the marking agreement for a given image chosen is the one limiting the risk of conflicts at the time of detecting said mark.

13. Method of watermarking set forth in claim 12, characterized in that one of said marking agreements is chosen according to the number of reference vectors in said image for each of said components.

14. Method of watermarking set forth in claim 1, characterized in that said mark is a pseudo-random binary signature written in a redundant manner.

15. Method of watermarking set forth in claim 1, characterized in that said components belong to the group comprising:
   the RGB components;
   the YUV components;
   the CMY components.

16. Method of detection set forth in claim 1, characterized in that a border between said reference vectors defining two zones respectively associated to the binary values "0" and "1", said recovering step also comprises a sub-step for identifying the zone in which said marked vector resides, and a step for associating a corresponding binary value.

17. Method of detection set forth in claim 1, characterized in that said mark is recovered at least twice, and in that a correlation calculation is implemented with regard to a reference signature, in order to decide whether the watermarking is or is not correctly detected.

18. Device for watermarking a color image that has at least three components,
   wherein the device comprises means for inserting a mark of watermarking, on at least one point of the image, according to an insertion rule taking into account the relative position of at least three component vectors associated to said at least one point, wherein the device comprises:
   means for calculating, for each of said at least one point, the distance between any two vectors of said at least three vectors,
   means for selecting, for each of said at least one point, two vectors as reference vectors and one vector to be marked in order to bear said mark of watermarking, said reference vectors being those the furthest away from each other and said vector to be marked is a central vector, positioned between said reference vectors.

19. Computer-readable storage medium comprising program code instructions that can be used in a computer to watermark a color image, having at least three components,
   wherein said program comprises instructions that are readable by a computer in order to carry out an insertion step of a mark of watermarking, in at least one point of the image, according to an insertion rule taking into account the relative position of at least three component vectors associated to said at least one point, said instructions carrying out, for each of said related points;
      a step of calculating the distance between any two vectors of said at least three vectors,
      a step of selecting two vectors as reference vectors and one vector to be marked in order to bear said mark of watermarking, said reference vectors being those the furthest away from each other, and
   said vector to be marked being a central vector, positioned between said reference vectors.

20. Method of watermarking a color image that has at least three components, wherein the method comprises:
   a computer performing:
   an insertion step of a mark of watermarking, on at least one point of the image, according to an insertion rule taking into account the relative position of three component vectors associated to said at least one point,
   wherein, for each of said related points, the method comprises:
      a step of calculating the distance between any two vectors of said at least three vectors,
      a step of selecting two vectors as reference vectors and one vector to be marked in order to bear said mark of watermarking, said reference vectors being those the furthest away from each other, and
   said vector to be marked being a central vector, positioned between said reference vectors, and
   a transformation step into wavelets of each of said components of the image, and wherein said at least three component vectors are set, for each point of at least one level of decomposition of said transformation into wavelets, for each of said components respectively.

21. Method of detecting a mark of watermarking a color image that has at least three components, wherein the method comprises:
   a computer performing:
   a recovering step of a mark of watermarking, on at least one point of the image, according to a recovering rule taking into account the relative position of three component vectors associated to said at least one point,
   wherein, for each of said related points, the method comprises:
      a step of calculating the distance between any two vectors of said at least three vectors, wherein the two vectors the furthest away from each other are reference vectors, the third vector being a marked vector bearing said mark of watermarking,
      a step of reading said mark of watermarking on said third vector.

22. Device for detecting a mark of watermarking a color image that has at least three components, wherein the device comprises means for recovering a mark of watermarking, on at least one point of the image, according to a recovering rule taking into account the relative position of at least three component vectors associated to said at least one point, wherein the device comprises:

means for calculating, for each of said at least one point, the distance between any two vectors of said at least three vectors, wherein the two vectors the furthest away from each other are reference vectors and the third vector is a marked vector bearing said mark of watermarking, and means for reading said mark of watermarking on said third vector.

23. Computer-readable storage medium comprising program code instructions that can be used in a computer to watermark a color image, having at least three components, wherein said program code instructions are readable by a computer in order to carry out a recovering step of a mark of watermarking, in at least one point of the image, according to a recovering rule taking into account the relative position of at least three component vectors associated to said at least one point, wherein said program code instructions comprise instructions to carry out, for each of said related points:

a step of calculating the distance between any two vectors of said at least three vectors, wherein the two vectors the furthest away from each other are reference vectors and the third vector is a marked vector bearing said mark of watermarking, and a step of reading said mark of watermarking on said third vector.

* * * * *